No. 748,686. PATENTED JAN. 5, 1904.
J. BAEUMLE.
PIPE ELBOW MACHINE.
APPLICATION FILED JUNE 14, 1902.
NO MODEL. 7 SHEETS—SHEET 1.

No. 748,686. PATENTED JAN. 5, 1904.
J. BAEUMLE.
PIPE ELBOW MACHINE.
APPLICATION FILED JUNE 14, 1902.
NO MODEL. 7 SHEETS—SHEET 2.

Witnesses:
F. A. Otto
C. L. Roesch.

Inventor
John Baeumle
By Erwin & Wheeler
Attorneys.

No. 748,686. PATENTED JAN. 5, 1904.
J. BAEUMLE.
PIPE ELBOW MACHINE.
APPLICATION FILED JUNE 14, 1902.
NO MODEL. 7 SHEETS—SHEET 3.

No. 748,686. PATENTED JAN. 5, 1904.
J. BAEUMLE.
PIPE ELBOW MACHINE.
APPLICATION FILED JUNE 14, 1902.
NO MODEL. 7 SHEETS—SHEET 5.

No. 748,686. PATENTED JAN. 5, 1904.
J. BAEUMLE.
PIPE ELBOW MACHINE.
APPLICATION FILED JUNE 14, 1902.
NO MODEL. 7 SHEETS—SHEET 7.

Witnesses:
F. A. Otto,
C. L. Roesch.

Inventor
John Baeumle
By Erwin E. Wheeler,
Attorneys.

THE NORRIS PETERS CO., PHOTO-LITHO., WASHINGTON, D. C.

No. 748,686. Patented January 5, 1904.

UNITED STATES PATENT OFFICE.

JOHN BAEUMLE, OF MILWAUKEE, WISCONSIN.

PIPE-ELBOW MACHINE.

SPECIFICATION forming part of Letters Patent No. 748,686, dated January 5, 1904.

Application filed June 14, 1902. Serial No. 111,615. (No model.)

*To all whom it may concern:*

Be it known that I, JOHN BAEUMLE, a citizen of the United States, residing at Milwaukee, county of Milwaukee, and State of Wisconsin, have invented new and useful Improvements in Pipe-Elbow Machines, of which the following is a specification.

My invention relates to improvements in that class of pipe-elbow machines in which the pipe-section is creased inwardly to form the elbow.

The object of my invention is to provide an efficient form of machine for performing in a series of automatic or mechanically-directed movements the operation of forming inwardly-extending eccentric creases in a pipe-section, whereby it is bent into elbow form, drawing the exterior surfaces together to close the recesses formed by creasing the pipe, and flattening the interior projections so as to leave a passage of maximum capacity, regard being also had for the formation of a joint having regular and symmetrical exterior surfaces.

My invention is explained by reference to the accompanying drawings, in which—

Like parts are identified by the same reference characters throughout the several views, and the working parts of the machine are first described, followed by a description of the motion-transmitting connections and a description of the operation of the machine, with especial reference to the functional relations and sequence of the various operations.

1 is a supporting-frame; 2, a driving-shaft to which motion is communicated from a source of power through a pulley 3, pinion 4, gear-wheel 5, and clutch 6. The pipe *a*, from which the elbow is to be formed, is adjusted over a stationary head 7 and head-cylinder 8, Fig. 1. The latter is supported at its rear end by the head-block 13, which constitutes part of the main frame, and the rear end of the pipe is inserted between the holding-rings 9 and 10, located on the cylinder. The meeting faces of these rings are preferably offset annularly, forming a shoulder *b* on the ring 10, against which the end of the pipe abuts. The front end of the pipe is also preferably provided with annular clamping-rings 11 and 12, which prevent the pipe from drawing out of shape at that end during the operation of forming the elbow.

The head 7 is cylindrical in form and constitutes a continuation of the cylinder 8. The interior of the head is provided with annular inwardly-projecting web-flanges r and s, the front flange r being located in the rear of the front end of the head and having a rearward pitch from top to bottom. The front portion of the outer or cylindrical wall of the head fits within and forms a bearing for the pipe a. A hood 17 is movably mounted in the frame (with interlocking bearings 18 therein, Figs. 19 and 20) and is provided with collars 19 and 20, which encircle the head-cylinder 8 and support a sleeve 21, which carries an apertured face-plate 22, on which the crimping-jaws are mounted, as hereinafter explained. The head is supported by the cylinder 8 in the face-plate aperture.

A split clamping-ring 15 is used to clamp the pipe to the head, being interposed between the latter and the walls of the face-plate aperture. This clamping-ring is provided with rearwardly-projecting arms 16, Fig. 21, which are connected with the collar 19 by bolts or pins 27, which project inwardly from the collar 19 through slots 25 in the sleeve 21, Fig. 20, and loosely engage in apertures in the arms 16, whereby the clamping-ring is connected with and caused to move with the hood 17. The bolts 27 preferably pass through bearing-blocks 26, Figs. 8 and 20, which slide in the slots 25 when the hood is adjusted to the front or rear, but which prevent the clamping-ring 15 from turning.

Figure 1:
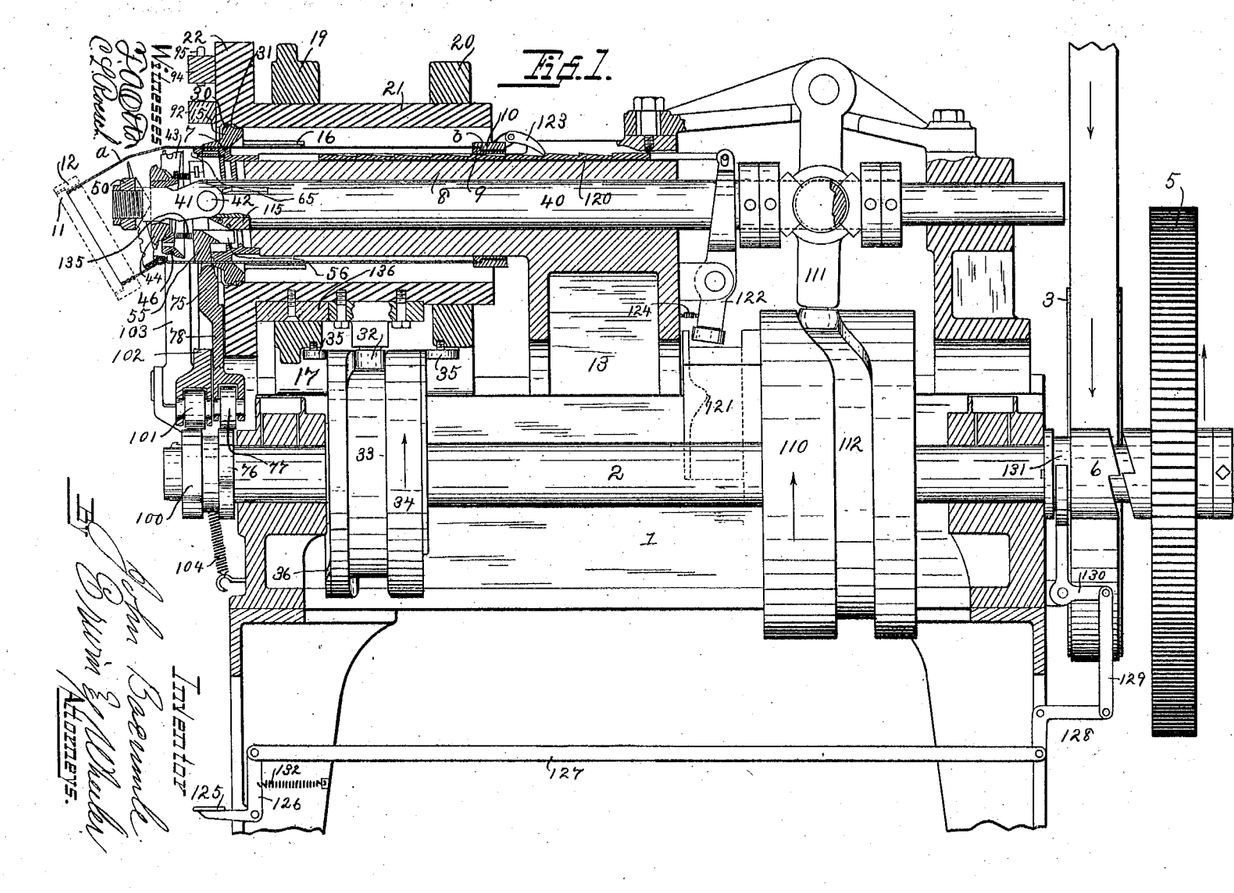
Figure 1 is a vertical longitudinal sectional view of my invention drawn on the axis of the pipe and its supporting-head and head-cylinder.
Figure 3:
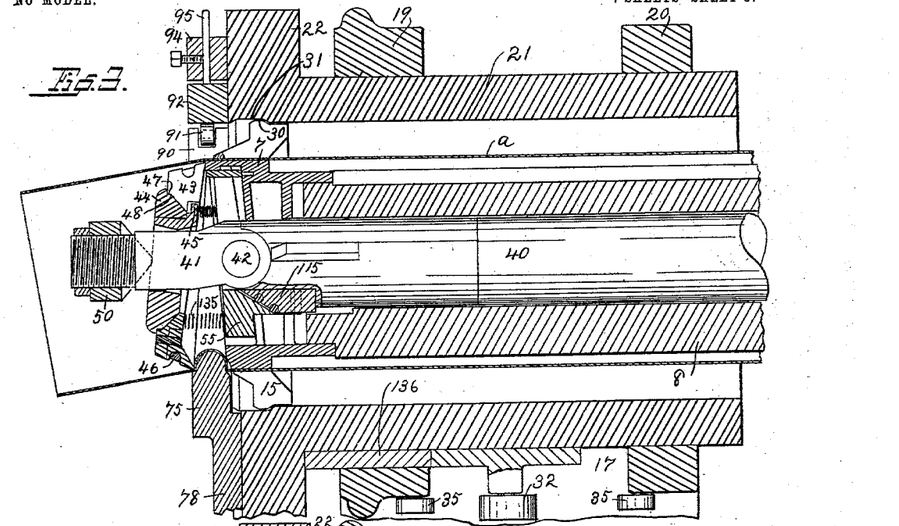
Figs. 3, 4, 5, and 6 are detail sectional views of the head portion of the machine drawn on the same lines as Fig. 1, but on a larger scale, and illustrating, respectively, the operation of creasing or crimping the pipe, drawing the exterior surfaces together, adjusting the various parts preparatory to pressing the inwardly-projecting creased portion of the pipe, and flattening the same upon the interior pipe-surfaces.
Figure 4:
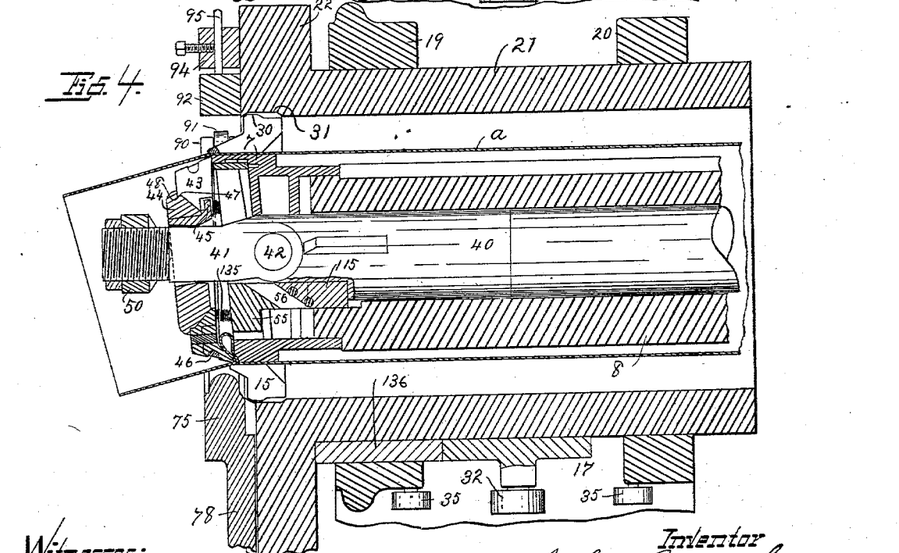
Figure 5:
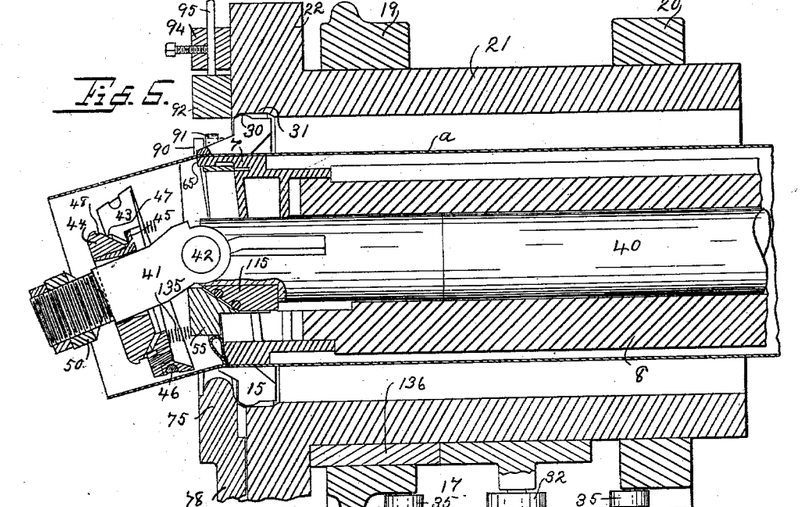
Figure 6:
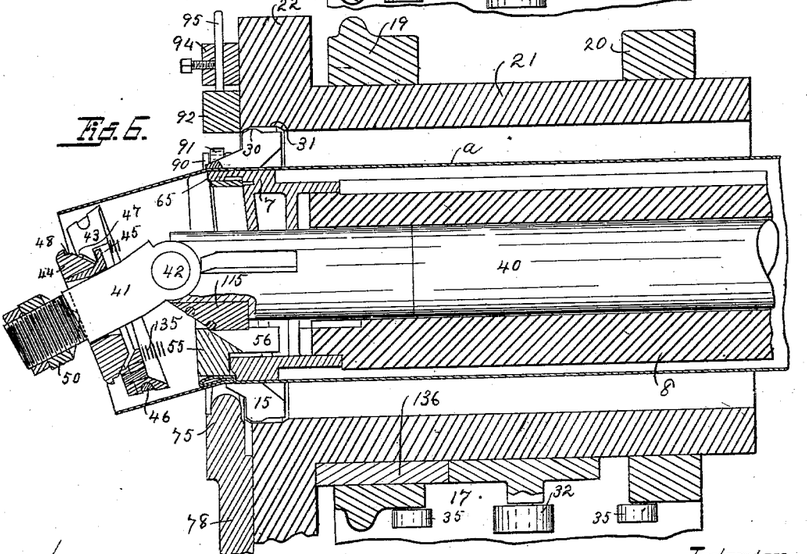
Figure 7:
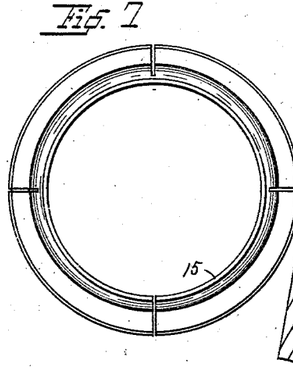
Fig. 7 is a front view of the clamping-ring used to bind the pipe forcibly to the head.
Figure 8:
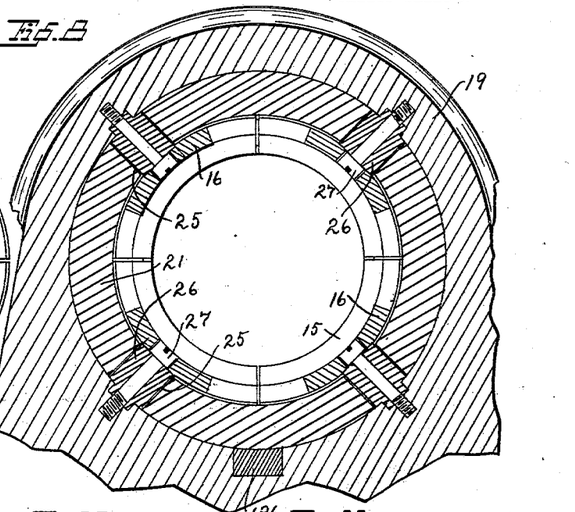
Fig. 8 is a detail cross-sectional view of the collar 19 and sleeve 21, showing the attachment for the connecting-bars of the clamping-ring.
Figure 9:
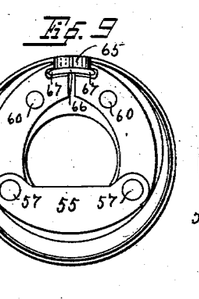
Fig. 9 is a front view of the expanding-press used to flatten the inwardly-projecting portions.

The exterior surface of the clamping-ring is provided with a flange 30, normally projecting into an annular channel 31 in the walls of the face-plate aperture. The sides of the flange and of the channel 31 are beveled, as shown, whereby when the sides of the flange 30 and channel 31 are brought in forcible contact the beveled surfaces of channel 31 act as a tubular wedge to bind the clamping-ring upon the head or upon the pipe interposed between it and the head, as shown in Fig. 1. It will be observed, however, that the channel 31 is wider than the flange 30, thus allowing a limited adjustment of the clamping-ring 15 independently of the face-plate. This construction enables me to move the clamping-ring 15 into a position directly over the head 7, as shown in Figs. 1 and 3, and also to adjust it forwardly from that position to the position in which it is shown in Figs. 4, 5, and 6, when it will cover the crease in the pipe formed by a preceding operation of the creasing-jaws. I have also provided for an adjustment of the face-plate 22 in order to retract the jaws longitudinally of the pipe during the operation of pressing the sides of the crease together, this being necessary in order to permit the pipe to bend downwardly without striking the jaws. When the clamping-ring 15 has been adjusted to its forward position over the crease in the pipe and the face-plate moved rearwardly, the beveled front walls of channel 31 act upon flange 30 of the clamping-ring 15 to compress the latter and bind it forcibly on the pipe a in the position in which it is shown in Figs. 4, 5, and 6. The face-plate is again adjusted forwardly (releasing the clamping-ring) and the clamping-ring is then adjusted rearwardly and clamped upon the pipe a, as shown in Fig. 3, preparatory to the next creasing operation of the jaws. To accomplish this movement of the face-plate, the sleeve 21 is provided with an arm having a bearing wheel or roller 32, which engages in an eccentric channel 33, formed in the periphery of the cam-wheel 34, carried by the shaft 2. To adjust the clamping-ring 15 in the two positions above described, the collars 19 and 20 are each provided with suitable studs upon which are mounted antifriction bearing-rollers 35. A diagonally-faced cam projection 36, carried by a wheel 34, is arranged for sliding contact with a roller 35, carried by collar 19, whereby said roller, together with the collar, hood 17, and clamping-ring 15, are moved forwardly in the frame until the ring 15 occupies the position in which it is shown in Figs. 4, 5, and 6. Another projection 37, located on the opposite side of the cam-wheel 34, is provided with a similar diagonal bearing-face which contacts with an antifriction bearing-wheel 35, mounted on the projecting stud of collar 20, and when the clamping-ring is in its forward position forces the bearing-wheel 35 and collar 20, together with the hood 17 and clamping-ring 15, backwardly until said clamping-ring occupies a position directly over the head 7 and in the rear of the plane of movement of the creasing-jaws. It will of course be understood that these cam projections 36 and 37 and the eccentric channel 33 in the wheel 34 are so formed that the described movement will take place at the appropriate intervals, the successive steps in the formation of the pipe being hereinafter more fully set forth.

An operating-bar 40 passes through the head-cylinder 8 and head and at its front end is provided with a link 41, which is connected with the bar 40 by means of a hinge-pin 42, which permits the link to oscillate vertically. An expanding-die 43 is mounted upon the link 41, being supported therefrom by a cone 44, with which it is loosely interlocked by means of a key 45. The die 43 coöperates with the head 7 in forming a female die during the operation of the creasing-jaws and also serves as a pinching-die coöperative with the head to draw the sides of the crease together after the creasing operation. For convenience of description I designate it the "vise" pinching-die.

Figure 2:
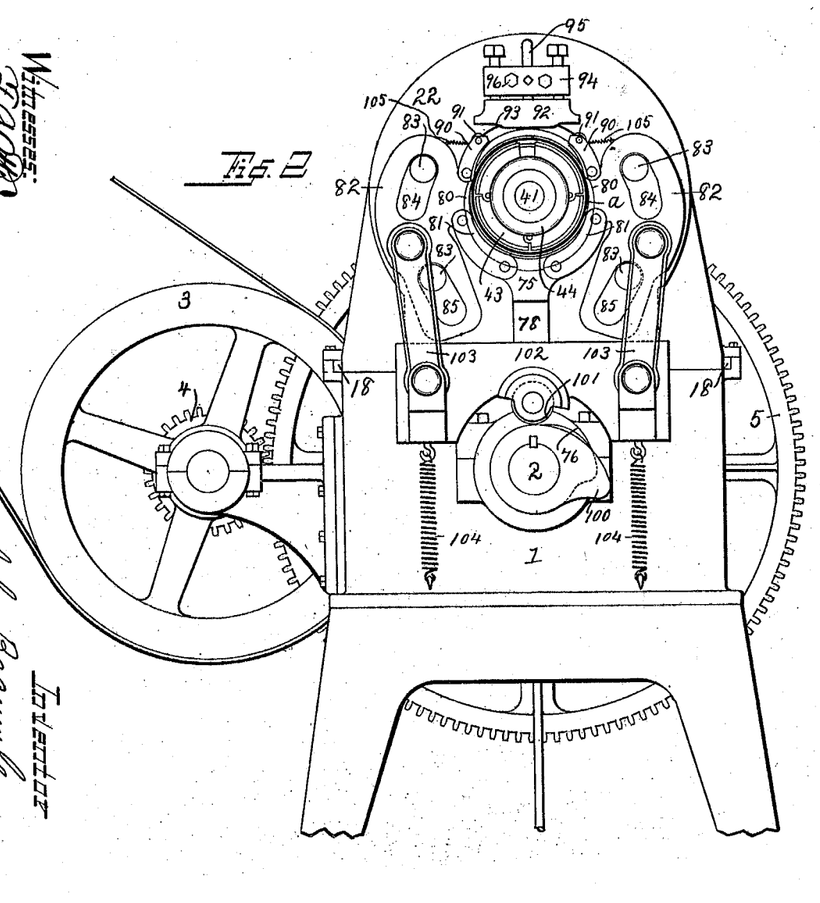
Fig. 2 is a front view of my invention.

The pinching-die 43 is formed in four sections hinged together to form a circular member, as best shown in Fig. 2, with the meeting ends of the upper sections unconnected, and a wire or split ring 46, of resilient material, is mounted in a channel in the die-sections and serves to hold them normally in their contracted position. During one movement of the bar 40, as hereinafter explained, the cone 44 is drawn inwardly between the sections of the pinching-die, causing the latter to spread in opposition to the tension of the ring 46, the pinching-die being adapted when spread to bear peripherally against all sides of the pipe except that portion which is directly over the point of separation of the sections. When the pinching-die is expanded, a segmental shoulder 47 on each of the sections engages in an annular notch 48 in the cone 44, when the cone will serve to hold the pinching-die in its expanded position. 50 is a nut used for holding the cone and adjusting it upon the link to the desired position.

Figures 12, 13, 20, 21, 22:
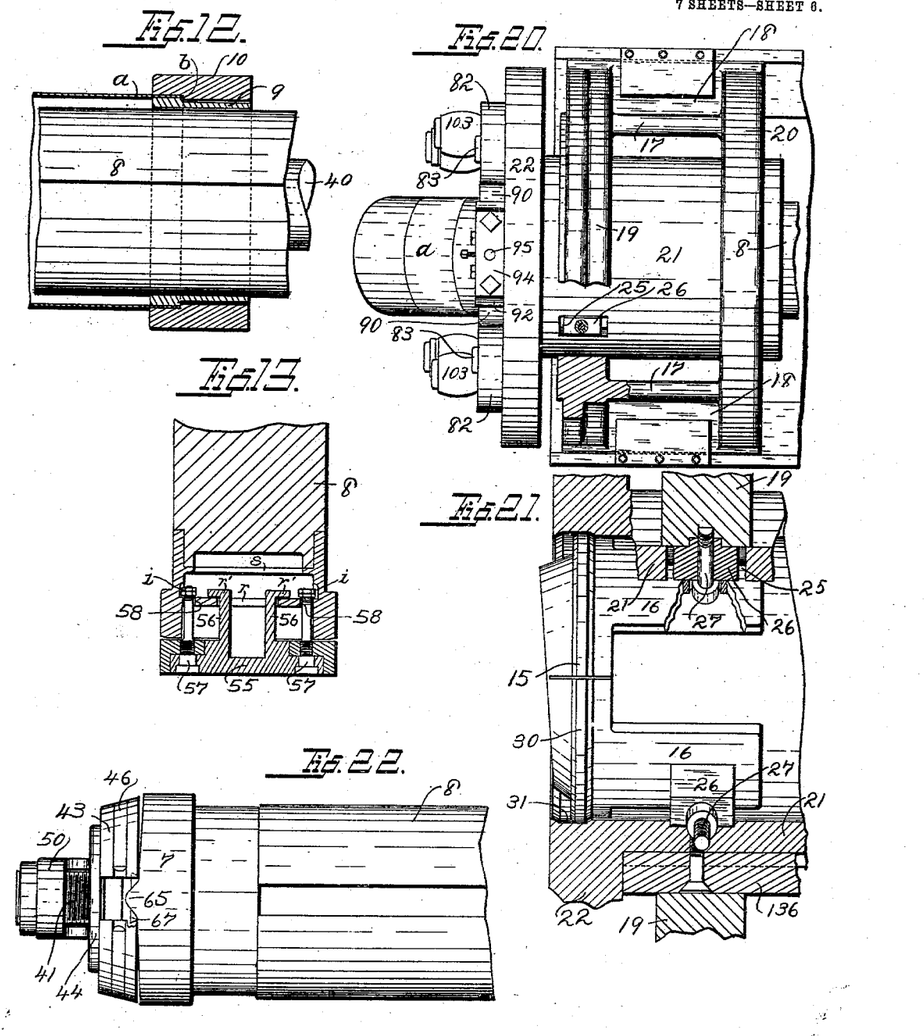
Fig. 12 is a detail sectional view of the holder for engaging the pipe at its rear end.
Fig. 13 is a sectional view drawn on line *x x* of Fig. 10.
Fig. 20 is a top view of the front end of the machine with the collar 19 partially broken away.
Fig. 21 is a detail view of the clamping-ring with the ring-adjusting arms and the parts connecting them with the collar 19.
Fig. 22 is a plan view of the head and the connecting mechanism operating within the pipe.
Figure 14:
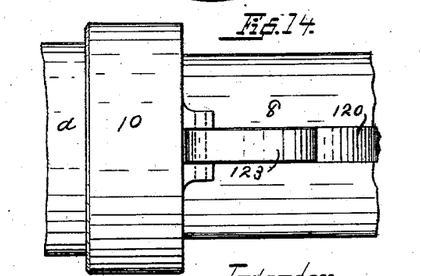
Fig. 14 is a top view in detail of the rear pipe-holder, showing the pawl and a portion of the rack engaged thereby, whereby the pipe is advanced.

The cylindrical outer wall of the head 7 projects beyond the flange $r$ and forms a recess in front of said flange, in which an expanding-collar 55 is normally located, this collar being used for flattening the creased or inwardly-projecting portion of the pipe. The collar 55 will hereinafter be termed the "press." It is formed in sections hinged together with the upper section unconnected at one point, so that it will be permitted to expand. The construction is similar in this respect to that of the pinching-die. The lower section is provided with arms 56, which project through an aperture in the flange $r$ of the head, and these arms are formed with interlocking lips $r'$, engaging the rear surface of flange $r$, as best shown in Fig. 13. The pivot-bolts 57 also project through slots 58 in the head-flange $r$, with nuts or heads $i$ at their inner ends to prevent them from slipping out of the slots. The slots 58 extend vertically. The upper portions of the press 55 are also provided with bolts 60, which project inwardly through curved slots 61 in the flange $r$, with the heads of the bolts also engaging the rear surface of flange $r$. The arms 56 and bolts 57 and 60 are of such length as to permit a limited forward and backward movement of the press 55, while the slots 61 and 58 are formed to not only permit the expansion of the press, but to serve as guideways by means of which the press is made to expand symmetrically. The upper portion of the head 7 is provided with a tapered or V-shaped projection 65, which extends over the line of the crimp or crease to be formed in the pipe and supports the interior surface of that portion of the pipe which is not acted upon by the creasing-jaws. The under surface of this projection 65 is provided with an offset portion 66, having outwardly-projecting flanges 67, against which the pinching-die engages when the latter is being used for drawing the sides of the crease together, the object of the flanges 67 being to provide a stop-bearing for the upper portion of the pinching-die when the latter is drawn inwardly, whereby it is prevented from acting upon the extremities of the crease in the pipe to such an extent as to press the sides of the crease entirely together at these points.

The creasing-jaws are formed in sections linked together in such a manner as to form an arc of a nearly complete circle when in the crimping position. The lower jaw-section 75 moves vertically, being actuated from the shaft 2 through the medium of a cam 76, roller 77, and bar 78. The jaw-sections 80 are linked to the jaw-sections 75 by means of the sections 81. The jaw-sections 80 are also connected with the supporting-plates 82, movably mounted upon the face-plate 22, with which they are connected by means of pins 83, engaging in guide-slots 84 and 85, these guide-slots being arranged at an angle to each other and the upper slots 84 being slightly curved, whereby upward pressure applied to the plates 82 will carry the jaws inwardly in coincidence with an arc corresponding with the curvature of the arc of the crease or crimp. At the same time the jaw-sections 81 will be moved upwardly and inwardly by the coöperative action of the sections 75 and 80. The upper jaw-sections 90 are pivotally secured to the jaw-sections 80 and provided with roller-bearings 91 at their upper ends, which engage with a block 92, having an angular under surface 93, against which the rollers 91 impinge. When the jaw-sections 90 are moved upwardly, the engagement of the rollers 91 with the block imparts a slight inward movement to the jaw-sections 90. The block 92 is preferably supported from the face-plate by means of a projection 94, into which a pin 95 extends from the block 92, set-screws 96 being used to adjust the block 92 vertically. An upward movement is communicated to the plates 82 from the shaft 2 through the medium of the cam 100, roller 101, cross-head 102, and arms 103, the latter being pivotally connected with the cross-head and with the plates 82, as best shown in Figs. 1 and 2. Springs 104 and 105 are used to facilitate the retraction of the jaws after the formation of the crease.

Figure 10:
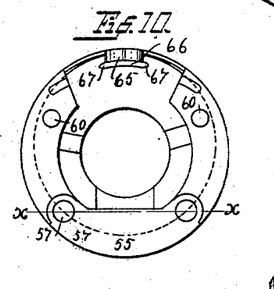
Fig. 10 is a view of the same, showing the press in its expanded position.
Figure 11:
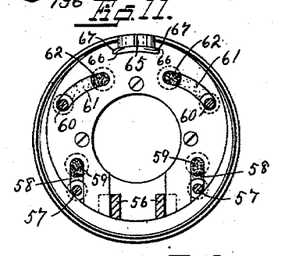
Fig. 11 is a front view of the head, illustrating the means for securing the press thereto.

To actuate the bar 40, motion is communicated thereto from the shaft 2 through the medium of the cam 110 and lever 111, engaging in the cam-groove 112. The press 55 is actuated from the bar 40, which is provided with a beveled or wedge-shaped shoulder 115, adapted to engage a correspondingly-beveled face on the lower section of the press 55 when the lever 111 pushes the bar 40 forwardly from the position in which it is shown in Fig. 1. The initial pressure of the shoulder 115 upon the press causes it to move outwardly beyond the head until it covers the creased portion of the pipe, Fig. 5, when the heads of the pins 60 and the laterally-projecting flanges of the arms 56 will engage in the undercut channels and limit the forward movement of the press. The continued forward movement of the bar 40 will then expand the press-sections to the position in which they are shown in Figs. 6 and 10, causing the press to bear forcibly upon and fold or flatten the inwardly-projecting and creased portion of the pipe. The press is contracted and lifted by the creasing-jaws when forming the next crease and is carried back to its original position within the head by the pinching-die 43 during the operation of the latter in drawing the sides of the crease together.

To move the pipe-section forwardly after it has been creased and the creased portion flattened, as herein explained, I have provided the head-cylinder 8 with a longitudinal channel in which a rack 120 is movably mounted. A longitudinal movement is communicated to this rack through the medium of a cam 121 and lever 122, the latter having jointed connection with the rack at its opposite end. A dog 123, attached to the clamping member 10, is adapted to engage the teeth of the rack. It is therefore obvious that whenever the rack is pushed forwardly the pipe-section will be pushed forward correspondingly, while with the rearward movement of the rack the dog 123 will slide over the rack-teeth, leaving the pipe-section in its advanced position. The rack is moved rearwardly by means of a spring 124, operative as soon as the cam projection 121 has passed the lower end of the lever 122. The distance between the rack-teeth is substantially equal to that between the creases and also to the length of stroke of the rack, so that with each forward movement the pipe-section will be advanced a distance equal to the distance between any two of the notches or teeth on the rack.

The position of the operator being in front of the machine, I have provided means for controlling its movement from this point. This is accomplished through the medium of the foot-treadle 125, elbow-lever 126, rod 127, elbow-lever 128, link 129, and elbow-lever 130, the latter being forked and engaged loosely in a channel 131 in the sliding clutch 6. This clutch is feathered to the shaft 2 and when moved into engagement with the counterpart jaws of the head of the gear-wheel 5 the machine is set in motion. As soon as the pressure on the foot-treadle is removed, however, the clutch is retracted by means of a spring 132 and the machine comes to rest.

Reviewing the operation of the machine and assuming that the parts are in the position in which they are shown in Fig. 1, it will be observed that two creases have already been formed in the pipe and that the pipe has been advanced preparatory to the formation of the next crease. The head-clamping ring 15 is adjusted in its rearward clamping position, binding the pipe to the head in the rear of the crimping-jaws. The machine being set in motion, the operation of the eccentric wheel 34 upon the arm 32 pushes the sleeve 21 forwardly, binding the clamping-ring 15 forcibly upon the head and carrying the jaws forwardly a sufficient distance to clear the head when moved inwardly to form the crease. The rotation of the cam 110 then retracts the lever 111 and draws in the pinching-die 43, through the medium of the bar 40 and link 41, until the springs 135, carried by the vise-collar, contact with the press 55, when the continued movement of the bar 40 draws the cone 44 between the members of the pinching-die to expand this die until the shoulders 47 engage notch 48, the pinching-die being then in a position for coöperation with the head in forming a female die for the creasing-jaws. The cam 110 is so formed that the lever 111 and bar 40 will then remain stationary for a period pending the operation of the creasing-jaws. The cam 76 then acts upon the roller 77 and lifts the latter, together with the bar 78 and lower jaw-section 75, for the initial creasing operation, Fig. 3. This movement is immediately followed by the action of cam 100 upon roller 101, Figs. 1 and 2, lifting the cross-head 102, and thereby communicating motion through the connecting parts to move the side jaws upwardly and inwardly to complete the crease in the pipe. As the pipe is creased it lifts and contracts the press-collar 55, the latter being then supported by the inwardly-projecting creased portion of the pipe. The continued revolution of the shaft 2 then brings the cam projection 36 into contact with the bearing-roller 35 of collar 19, when said collar, hood 17, and clamping-ring 15 are pushed forwardly until the clamping-ring occupies a position covering the creased portion of the pipe. The diagonal portion $f$ of the channel 33 then comes into registry with the bearing-roller 32, when said bearing-roller, together with the sleeve 21 and face-plate 22, will be moved backwardly to readjust the jaws backwardly along the pipe and restore them to the position in which they are shown in Fig. 1 and at the same time clamp the clamping-ring 15 upon the pipe through the medium of the beveled front surface of the face-plate channel 31, engaging the clamping-ring flange 30. The cam 110 then again operates to retract the lever 111 beyond its position during the creasing operation and draw in the pinching-die 43 to draw the sides of the crease forcibly together, Fig. 4. It will be observed that the inner face of the pinching-die is concave, so that it exerts pressure principally at its outer margin when drawn toward the head. It therefore draws the pipe-walls together at the periphery, while that part of the crease within the line of pressure is not flattened, but is left projecting into the concavity of the pinching-die, as shown. In this manner the creased portion of the pipe is given a forward pitch, which facilitates the operation of the press in flattening it upon the inner surface of the pipe in advance of the line of the crease. This inward movement of the pinching-die in pressing the sides of the crease together pushes the press back into the recessed head 7 through the medium of the springs 135. The lever 111 is then advanced by means of the cam 110, whereupon the friction of the pinching-die against the interior surface of the pipe retains it until forward movement of the bar 40 pushes the cone 44 out of the pinching-die, whereupon the reaction of the spring 46 retracts the pinching-die out of contact with the pipe, and it is then carried forwardly with the cone by means of the key 45, as illustrated in Fig. 5. As the engagement of the pinching-die in the notch 48 of the cone is extremely slight, the frictional contact of the link 41 upon the cone is sufficient to release the latter from the pinching-die, when the reaction of the spring 46 retracts the collar and the latter acts upon the tapered face of the cone to push the same backwardly, the cone and collar then hanging loosely upon the link 41. The further forward movement of the bar 40 then brings the wedge-shaped surface 115 into contact with the press, when the latter moves outwardly from the head until the interlocking bolts and arms 60 and 56 limit its further movement in this direction, Fig. 5. The continued movement of the bar 40 then causes the wedge 115 to bear upon the lower section of the press, forcing the latter downwardly, when the pins 60 will be caused to travel outwardly in the curved slot 61, thus causing the sides of the press to also push outwardly against the creased portion of the pipe until the sections assume a position substantially in the arc of a circle, as best illustrated in Figs. 6 and 10. When moved to this position, the press forces the inwardly-projecting creased portion of the pipe outwardly and folds the same flatly against the interior surface of the pipe in advance of the line of the crease, as shown in Fig. 6, the clamping-ring 15 being operative to prevent the seam from drawing apart. The lever 111 and bar 40 are then again retracted to relieve the pressure upon the press, when the cam projection 37 again acts on the bearing-roller 35 of collar 20 to withdraw the clamping-ring 15 from its position over the crease, Fig. 6, to its position over the head, when the flange 30 on the clamping-ring will register with the channel 31 in the face-plate, the resilience of the clamping-ring causing it to spread and relieve the pressure upon the pipe. Then the cam 121 acts upon the lever 122 and operates through the medium of the rack-bar 120, dog 123, and clamps 9 and 10 to push the pipe-section forwardly into position for the next creasing operation, the parts being thus restored to the position illustrated in Fig. 1.

Figures 15, 16, 17, 18, 19:
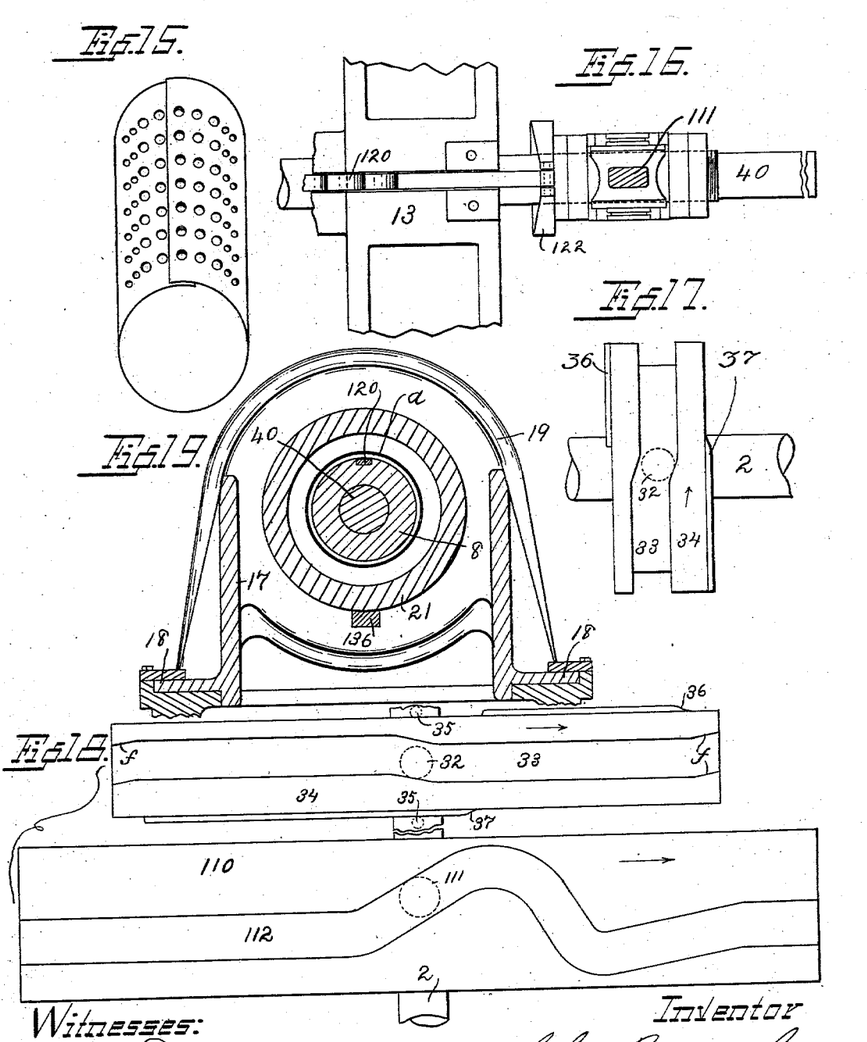
Fig. 15 is a view of a section of pipe as it is prepared for insertion in the machine.
Fig. 16 is a top view in detail of the rear portion of the bar 40 and lever connections for actuating the same, showing also the rear end of the rack 120 and its actuating-lever.
Fig. 17 is a detail top view of the cam projections 36 and 37 in the position in which they are shown in Fig. 1.
Fig. 18 is a plan view of the periphery of cams 110 and 34, showing the coöperative relation of the cam projections.
Fig. 19 is a transverse sectional view of the head 17, drawn between the collars 19 and 20.

Preparatory to inserting the pipe in the machine it is preferably perforated, as illustrated in Fig. 15, the creases being formed on the transverse lines of the perforations. This prevents the creased portions from buckling during the operation of the press-collar.

It will be observed that the pinching-die is provided with coiled springs 135, connected with and projecting from the inner faces of the die-sections. These springs are adapted to bear against the press when the pinching-die is drawn inwardly by bar 40, the springs serving to resist the inward movement of the pinching-die until it is expanded by the cone, which is drawn into it by bar 40. The springs also serve to straighten up the pinching-die vertically during the entry of the cone and during the drawing operation, but yield sufficiently to permit said die to move inwardly into close proximity to the head during that operation. They also serve to push the retracted press into the head. It will also be observed that I have provided a key 136 to prevent the sleeve 21 from turning in the collars 19 and 20.

Having thus described my invention, what I claim as new, and desire to secure by Letters Patent, is—

1. In a machine of the described class, the combination of an expansible circular pinching-die and an expansible circular press, both operative in the same plane but at different stages in the process of forming a pipe-elbow, said pinching-die being movable in its expanded position to draw the sides of a pipe-crease together, and said press being movable in its contracted position and expansible to flatten the creased portion upon the interior surface of the pipe.

2. In a machine of the described class, the combination of an expansible circular pinching-die and an expansible circular press, both operative in the same plane but at different stages in the process of forming a pipe-elbow, said pinching-die being movable in its expanded position to draw the sides of a pipe-crease together, and said press being movable in its contracted position and expansible to flatten the creased portion upon the interior surface of the pipe, together with means for adjusting said members into operative position from opposite directions.

3. In a machine of the described class, the combination of an expansible circular pinching-die and an expansible circular press, both operative in the same plane but at different stages in the process of forming a pipe-elbow, said pinching-die being movable in its expanded position to draw the sides of a pipe-crease together, and said press being movable in its contracted position and expansible to flatten the creased portion upon the interior surface of the pipe, together with automatic means for advancing the pipe after the operation of the press and means for contracting the pinching-die during the advancement of the pipe to afford clearance for the creased portion of the pipe.

4. In a machine of the described class, the combination of a cylindrical, pipe-supporting head and an expansible press normally located within the head and movable to a position in advance thereof.

5. In a machine of the described class, the combination of a cylindrical, pipe-supporting head and an expansible press normally located within the head and movable to a position in advance thereof, together with loose connections between the press and the head.

6. In a machine of the described class, an expansible press, formed in sections linked together and provided with smooth segmental outer surfaces adapted, when expanded, to form a cylindrical body having all portions of said outer surfaces at approximately the same radial distance from the central axis; and means for expanding said press within a pipe.

7. In a machine of the described class, the combination of an expansible circular die member and an expansible circular press; an operating-rod, linked to the die member, and having a wedge-shaped surface, adapted to engage and operate the press when moved in one direction.

8. In a machine of the described class, the combination with a pipe-support, of an expansible circular press normally located within the same, an expansible die member located in advance of the pipe-support, an operating-rod extending through the pipe-support and provided with a link supporting the die member; and means, connected with said rod, for moving the press out of the head and expanding the press.

9. In a machine of the described class, the combination with a pipe-support, of an expansible circular press normally located within the same, an expansible die member located in advance of the pipe-support, an operating-rod extending through the pipe-support and provided with a link supporting the die member; and means, connected with said rod, for moving the press out of the head and expanding the press; and pipe-creasing mechanism, operative between the pipe-support and die member.

10. In a machine of the described class, the combination with a pipe-supporting head, having an interior web-flange; of an expansible circular press, normally located within the head, and having projections extending through suitable apertures in said flange and interlocking therein; said projections being adapted to permit the movement of the press to a position in advance of the head, and its expansion when in such position.

11. In a machine of the described class, an expansible die member, formed with a concave inner face, and adapted for drawing the sides of an inwardly-projecting pipe-crease together, at the periphery of the pipe.

12. In a machine of the described class, an expansible pinching-die, formed with a concave inner face, and adapted for drawing the sides of an inwardly-projecting pipe-crease together, at the periphery of the pipe, and a stop adapted to engage the upper portions of the pinching-die during the drawing operation whereby pressure upon the upper portion of the pipe-crease is relieved.

13. In a machine of the described class, the combination of an expansible die member and an expansible press; an operating-rod for adjusting the die and having a projection adapted to engage and actuate the press in one direction, and springs projecting from the inner face of the die member and adapted to engage and actuate the press in the other direction.

14. In a machine of the described class, the combination of a pipe-supporting head having a longitudinally-extending projection, creasing mechanism operating in a plane cutting said projections to crease a pipe inwardly at all points except that occupied by the projection; a pipe-clamp movable into and out of the plane of the crease; and means for folding the creased pipe portion, when the clamp is moved to clamping position over such portion of the pipe.

15. In a machine of the described class, the combination of a supporting face-plate; a pipe-support projecting through an aperture thereof; a set of creasing-jaws operatively movable thereon; and means for adjusting the face-plate and jaws longitudinally of the pipe-support.

16. In a machine of the described class, the combination of a supporting face-plate; a pipe-support projecting through an aperture in the face-plate; a set of creasing-jaws operatively movable to crease a pipe carried by the support; means, operative within the pipe, for drawing the sides of the crease together; and means for adjusting the face-plate and jaws out of the plane of the crease during the drawing operation, thereby affording clearance for short elbows.

17. In a machine of the described class, the combination of a pipe-support; a bar projecting through the same; a conical expander connected with the bar; and a pinching-die connected with the expander, said die being formed in sections linked together at all points but one, and said expander being formed to enter between the sections.

18. In a machine of the described class, the combination of a series of members linked together to form a generally circular device, open at one side; an open ring of resilient material, encircling said members and normally holding them in a contracted position; and means for spreading the members.

19. In a machine of the described class, the combination of a series of members linked together to form a generally circular device, open at one side; an open ring of resilient material, encircling said members and normally holding them in a contracted position; and means for spreading the members and adjusting them into forcible contact with a portion of the interior surface of a pipe.

20. In a device of the described class, the combination of a pipe-supporting head; a bar extending therethrough; an expander supported from the bar; an expansible device comprising a series of sections linked together and encircling the expander; and means for actuating the bar to force the expander between said linked sections, said expander being adapted to force the sections outwardly to form an open ring of substantially the same peripheral contour as the head; and said bar being adapted to adjust the sections to coöperate with the head in forming either a vise or die.

21. In a machine of the described class, the combination of a pipe-supporting head; an operating-bar extending through the head; a section, linked end to end with the operating-bar, and projecting in front of the head; an expansible pinching-die connected with the linked section in coöperative relation to the head; means for expanding and contracting said pinching-die; means for adjusting the same into pinching relation to the head; together with a set of creasing-jaws, adjusted to operate between the head and said pinching-die when the latter is in one position of adjustment; exterior clamping devices adapted to forcibly engage and bind the pipe to the head during the operation of the creasing-jaws, and adapted to be adjusted over the crease during the pinching operation of the pinching-die.

22. In a machine of the described class, a pipe-holding clamp comprising a split ring, and a conical wedge adjustable upon the ring.

23. In a machine of the described class, a pipe-holding clamp comprising a split ring, and a conical wedge adapted to engage the ring in one or more positions of ring adjustment.

24. In a machine of the described class, an adjustable pipe-holding clamp, comprising a split ring; a clamp-actuating device covering the ring; an annular recess formed with beveled sides; and means for adjusting said ring to bring it into wedging contact with one of said beveled surfaces.

25. In a machine of the described class, an adjustable pipe-holding clamp, comprising a split ring; a clamp-actuating device covering the ring, and having an annular recess formed with beveled sides; means for adjusting the ring in different clamping positions; and means for adjusting the clamp-actuating device in two directions, the beveled sides of said recess forming oppositely-disposed tubular wedges for the ring, whereby the adjustment of the ring or actuating device in either direction, adjusts the ring to clamping position.

26. In a machine of the described class, a press for flattening the creased portions of the pipe, comprising a series of connected sections adapted to be expanded into an arc corresponding substantially with the curvature of the pipe; a support for said press-sections; and a wedge-bar adapted to expand the sections.

27. In a machine of the described class, the combination with a pipe-support; a sectional press supported therefrom in a position for operation within a pipe; and an expander for the press; said support being provided with interlocking guides adapted to direct the movement of the press-sections when actuated by the expander, and also adapted to permit the press, when contracted, to be adjusted longitudinally of the pipe.

28. In a machine of the described class, the combination with a pipe-support; a sectional press, operative with a pipe, adjusted to the support; a set of creasing-jaws operative upon the exterior pipe-surfaces; means for adjusting the press into and out of the plane of movement of the creasing-jaws; and an expander adapted to push the press-sections into forcible contact with the creased portions of the pipe.

29. In a machine of the described class, the combination with an annular pipe-support; a longitudinally-movable bar extending therethrough; a pinching-die connected with the bar, in a position to coöperate with the pipe-support in forming a die; a set of creasing-jaws operative exteriorly of the pipe, to crease the same between the pinching-die and the pipe-support; and means for adjusting said pinching-die toward and away from the pipe-support, after the creasing operation.

30. In a machine of the described class, the combination with an annular pipe-support; a longitudinally-movable bar extending therethrough; a pinching-die connected with the bar, in a position to coöperate with the pipe-support in forming a die; a set of creasing-jaws operative exteriorly of the pipe, to crease the same between the pinching-die and the pipe-support; means for adjusting said pinching-die toward and away from the pipe-support, after the creasing operation; and means for expanding and contracting the pinching-die.

31. In a machine of the described class, the combination with an annular pipe-support; a longitudinally-movable bar extending therethrough; a pinching-die connected with the bar, in a position to coöperate with the pipe-support in forming a female die; a set of creasing-jaws operative exteriorly of the pipe, to crease the same between the pinching-die and the pipe-support; means for adjusting said pinching-die toward and away from the pipe-support, after the creasing operation; means for expanding and contracting the pinching-die; and a movable press-ring adapted to be adjusted and operated in the plane of the creasing-jaws, during the intervals between the creasing operation.

32. In a device of the described class, the combination with a pipe-supporting head; a longitudinally-movable bar extending therethrough; a pinching-die connected with the bar, and adapted to coöperate with the head in forming a female die; a set of creasing-jaws adapted to operate between the pinching-die and the head; a press, a device, carried by said bar, for adjusting the press into the plane of the creasing-jaws during the interval between the creasing operation, said bar being also operative to actuate the press upon the inwardly-projecting pipe portions.

33. In a device of the described class, the combination with a pipe-supporting head; a longitudinally-movable bar extending therethrough; a pinching-die connected with the bar, and adapted to coöperate with the head in forming a female die; a set of creasing-jaws adapted to operate between the pinching-die and the head; a press, a device, carried by said bar, for adjusting the press into the plane of the creasing-jaws during the interval between the creasing operations, said bar being also operative to actuate the press upon the inwardly-projecting pipe portions, and to adjust the pinching-die toward and away from the head.

34. In a device of the described class, the combination with a pipe-supporting head; a longitudinally-movable bar extending therethrough; a pinching-die connected with the bar, and adapted to coöperate with the head in forming a female die; a set of creasing-jaws adapted to operate between the pinching-die and the head; a press, a device carried by said bar, for adjusting the press into the plane of the creasing-jaws during the interval between the creasing operations, said bar being also operative to actuate the press upon the inwardly-projecting pipe portions, and to adjust the pinching-die toward and away from the head, after the operation of the creasing-jaws, and preparatory to the operation of the press.

35. In a device of the described class, the combination with a pipe-supporting head; a longitudinally-movable bar extending therethrough; a pinching-die connected with the bar, and adapted to coöperate with the head in forming a female die; a set of creasing-jaws adapted to operate between the pinching-die and the head; a press, a device, carried by said bar, for adjusting the press into the plane of the creasing-jaws during the interval between the creasing operations, said bar being also operative to actuate the press upon the inwardly-projecting pipe portions, and said pinching-die being adapted to contract diametrically when in operative position.

36. In a device of the described class, the combination with a pipe-supporting head; a longitudinally-movable bar extending therethrough; a pinching-die connected with the bar, and adapted to coöperate with the head in forming a female die; a set of creasing-jaws adapted to operate between the pinching-die and the head; a press, a device, carried by said bar, for adjusting the press into the plane of the creasing-jaws during the interval between the creasing operation, said bar being also operative to actuate the press upon the inwardly-projecting pipe portions; together with means for readjusting the pipe-section after the operation of the press.

37. In a device of the described class, the combination with a pipe-supporting head; a longitudinally-movable bar extending therethrough; a pinching-die connected with the bar, and adapted to coöperate with the head in forming a female die; a set of creasing-jaws adapted to operate between the pinching-die and the head; a press, a device, carried by said bar, for adjusting the press into the plane of the creasing-jaws during the interval between the creasing operations, said bar being also operative to actuate the press upon the inwardly-projecting pipe portions—and said pinching-die being adapted to contract diametrically when in operative position; together with means for clamping the pipe to the head during the operation of the creasing and pressing mechanism, and adjusting the same longitudinally in the intervals between such operations.

38. In a machine of the described class, the combination with a pipe-supporting head; of a pinching-die adjustable thereto and operative within a pipe supported on the head; a set of creasing-jaws, operative exteriorly to crease the pipe between the pinching-die and head; an interiorly-operating press adjustable longitudinally of the pipe and operative in the plane of the creasing-jaws; a driving-shaft; cams mounted on the shaft; and connections adapted to communicate motion therefrom to the jaws, pinching-die and press.

39. In a machine of the described class, the combination of an apertured face-plate; a pipe-supporting head located in said aperture; creasing-jaws supported from the face-plate; an expansible pipe-support coöperative with the head to form a die for the creasing-jaws; means for adjusting said expansible pipe-support toward and away from the head after the operation of the jaws; and automatic devices for contracting said support when adjusted away from the head.

40. In a machine of the described class, the combination of an apertured face-plate; a pipe-supporting head located in said aperture; creasing-jaws supported from the face-plate; an expansible pipe-support coöperative with the head to form a die for the creasing-jaws; means for adjusting said expansible pipe-support toward and away from the head after the operation of the jaws; and automatic devices for contracting said support when adjusted away from the head; together with an expander connected with the adjusting mechanism for expanding said support when adjusted toward the head.

41. In a machine of the described class, the combination of an apertured face-plate; a pipe-supporting head located in said aperture; creasing-jaws supported from the face-plate; an expansible pipe-support coöperative with the head to form a die for the creasing-jaws; means for adjusting said expansible pipe-support toward and away from the head after the operation of the jaws; automatic devices for contracting said support when adjusted away from the head; together with an expander connected with the adjusting mechanism for expanding said support when adjusted toward the head; an expansible press connected with the head; and means for adjusting the same into and out of the plane of the jaws, and expanding the same when adjusted to the creased portion of the pipe.

42. In a machine of the described class, the combination of an apertured face-plate; a pipe-supporting head located in said aperture; creasing-jaws supported from the face-plate; an expansible pipe-support coöperative with the head to form a die for the creasing-jaws; means for adjusting said expansible pipe-support toward and away from the head after the operation of the jaws; automatic devices for contracting said support when adjusted toward the head; together with an expander connected with the head; means for adjusting the same into and out of the plane of the jaws, and expanding the same when adjusted to the creased portion of the pipe; an adjustable pipe-holding clamp; and means for binding the same upon the pipe in two or more positions of adjustment.

43. In a machine of the described class, the combination of an apertured face-plate; a pipe-supporting head located in said aperture; creasing-jaws supported from the face-plate; a device for drawing the sides of the crease together; and means for retracting the face-plate and jaws longitudinally of the pipe, preparatory to said drawing operation; together with adjustable clamping mechanism for exteriorly compressing and holding the pipe over the head in one position of adjustment, and over the crease in another position.

44. In a machine of the described class, the combination of a pipe-support; a set of creasing-jaws grouped in proximity to the support, and adapted to partially encircle a pipe adjusted to said support; means for actuating the jaws inwardly to crease the pipe; and means for adjusting them longitudinally of the pipe when retracted.

45. In a machine of the described class, the combination of a pipe-supporting head; a set of creasing-jaws grouped in proximity to the head; a pinching-die movably mounted in front of the head; mechanism for actuating the pinching-die toward and away from the head; and mechanism for adjusting the jaws in a position for operation between the pinching-die and head, and in a different plane, with the jaws partially overlapping the head during the final movement of the pinching-die toward the head.

46. In a machine of the described class, the combination of a pipe-supporting head and head-cylinder; a clamping-ring encircling the head; creasing-jaws operatively located with reference to a pipe supported by the head; a pinching-die for drawing together the sides of a crease; and a press for flattening the inwardly-projecting portions; together with an actuating-shaft provided with a series of cams; and connections for transmitting motion from said cams to the clamping-ring, creasing-jaws, pinching-die and press.

47. In a machine of the described class, the combination of a supporting-frame; a pipe-supporting head and head-cylinder; an adjustable hood movably mounted in the frame, and provided with collars encircling the head-cylinder; a sleeve adjusted over the head-cylinder and mounted in said collars; a face-plate supported from the sleeve, and provided with an aperture in registry with the head; creasing-jaws mounted on the face-plate; an operating-bar projecting through the head-cylinder; and crease-flattening devices connected with the operating-bar.

48. In a machine of the described class, the combination of a pipe-supporting head, and head-cylinder; a set of creasing-jaws located in operative relation thereto; a pipe-holding collar on said cylinder, having an abutment for the end of the pipe; a second collar adapted to coöperate with the first-mentioned collar in holding the pipe against said abutment; and means for advancing said collars intermittently along the cylinder.

49. In a machine of the described class, the combination of a pipe-support; a set of creasing-jaws located in operative relation thereto; link connections between said creasing-jaws; a reciprocating, actuating-bar directly connected with the central jaw; jaw-carriers connected with other of said jaws; curved guides for said jaw-carriers; actuating-bars having jointed connection with the carriers; together with a suitable driving-shaft; a cam mounted thereon in operative relation to the actuating-bar of the central jaw; and a second cam mounted thereon in operative relation to the actuating-bar of the other jaws; said cams being so located that the initial movement produced by the cam acting upon the central jaw, will take place in advance of the initial jaw-actuating movements of the other cam.

50. In a machine of the described class, the combination of a pipe-support; a set of creasing-jaws linked together in operative relation thereto; a jaw-actuating bar directly connected with the central jaw of said set; jaw-carriers connected with the side bars of said set; curved guides for the jaw-carriers; a movable cross-head; links connecting said cross-head with the jaw-carriers; an actuating-cam operative upon the cross-head; and another actuating-cam, operative upon the bar connected with the central jaw.

51. In a machine of the described class, the combination of a pipe-support; a set of creasing-jaws linked together in operative relation thereto; a jaw-actuating bar directly connected with the central jaw of said set; jaw-carriers connected with the side bars of said set; curved guides for the jaw-carriers; upper jaws resiliently supported from the side jaws; a guide-block for directing said upper jaws; a movable cross-head; links connecting said cross-head with the jaw-carriers; an actuating-cam operative upon the cross-head; and another actuating-cam operative upon the bar connected with the central jaw.

52. In a machine of the described class, the combination of a pipe-support; a set of creasing-jaws linked together in operative relation thereto; a jaw-actuating bar directly connected with the central jaw of said set; jaw-carriers connected with the side bars of said set; curved guides for the jaw-carriers; upper jaws resiliently supported from the side jaws; a guide-block for directing said upper jaws; intermediate jaws linked to the side jaws and the central jaw; a movable cross-head; links connecting said cross-head with the jaw-carriers; an actuating-cam operative upon the cross-head; and another actuating-cam operative upon the bar connected with the central jaw.

53. In a machine of the described class, the combination of a pipe-support; a set of creasing-jaws linked together in operative relation thereto; a jaw-actuating bar directly connected with the central jaw of said set; jaw-carriers connected with the side bars of said set; curved guides for the jaw-carriers; upper jaws resiliently supported from the side jaws; an adjustable guide-block for directing said upper jaws; a movable cross-head; links connecting said cross-head with the jaw-carriers; an actuating-cam operative upon the cross-head; and another actuating-cam operative upon the bar connected with the central jaw.

54. In a machine of the described class, the combination of a pipe-support; a set of creasing-jaws linked together in operative relation thereto; a jaw-actuating bar directly connected with the central jaw of said set; jaw-carriers connected with the side bars of said set; curved guides for the jaw-carriers; a movable cross-head; links connecting said cross-head with the jaw-carriers; an actuating-cam operative upon the cross-head; another actuating-cam operative upon the bar connected with the central jaw; and retracting-springs connecting the cross-head with a suitable fixed support.

55. In a machine of the described class, the combination of an apertured face-plate; a set of creasing-jaws mounted on the face-plate and grouped around said aperture; a pipe-support in registry with said aperture; a pipe-clamping split ring encircling the pipe-support, and provided with a peripheral flange adapted to engage beveled contact-surfaces on the face-plate, whereby the ring is forced to clamping position.

56. In a machine of the described class, the combination of a fixed pipe-supporting head; a pinching-die, crimping-jaws for forming a groove in the pipe between the pipe-supporting head and the pinching-die; means for actuating the pinching-die to close the groove to form a seam and means for retracting the pinching-die and folding the seam flat against the body of the pipe, substantially as described.

In testimony whereof I affix my signature in the presence of two witnesses.

JOHN BAEUMLE.

Witnesses:
 LYMAN G. WHEELER,
 LEVERETT C. WHEELER.